United States Patent
Yumoto

(10) Patent No.: US 7,222,038 B2
(45) Date of Patent: May 22, 2007

(54) DETECTING A DEFECTIVE AREA OF AN INSPECTED APPARATUS

(75) Inventor: Takuya Yumoto, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 56 days.

(21) Appl. No.: 11/002,589

(22) Filed: Dec. 3, 2004

(65) Prior Publication Data
US 2005/0137818 A1 Jun. 23, 2005

(30) Foreign Application Priority Data
Dec. 4, 2003 (JP) ............................. 2003-405575

(51) Int. Cl.
*G01R 31/00* (2006.01)
(52) U.S. Cl. .................. 702/108; 702/83; 702/120; 702/117; 714/724
(58) Field of Classification Search ................ 702/108, 702/117–120, 123, 81–84, 80, 58, 59, 182, 702/183, 185, 193, 35, 36, 40, 34
See application file for complete search history.

(56) References Cited

U.S. PATENT DOCUMENTS

| | | | | |
|---|---|---|---|---|
| 5,617,429 A | * | 4/1997 | Goto | 714/736 |
| 5,745,501 A | * | 4/1998 | Garner et al. | 714/741 |
| 5,894,528 A | * | 4/1999 | Yasumi et al. | 382/302 |
| 5,930,271 A | * | 7/1999 | Takahashi | 714/738 |
| 6,553,530 B1 | * | 4/2003 | Kim | 714/738 |
| 6,708,301 B1 | * | 3/2004 | Ohta et al. | 714/724 |
| 7,062,696 B2 | * | 6/2006 | Barry et al. | 714/738 |
| 2005/0071102 A1 | * | 3/2005 | Shimizu | 702/83 |
| 2006/0059387 A1 | * | 3/2006 | Swoboda et al. | 714/30 |

FOREIGN PATENT DOCUMENTS

JP 3-297262 12/1991
JP 9-102839 4/1997

* cited by examiner

*Primary Examiner*—Hal Wachsman
(74) *Attorney, Agent, or Firm*—Oblon, Spivak, McClelland, Maier & Neustadt, P.C.

(57) ABSTRACT

Detecting a defect of an inspected apparatus having a plurality of functional blocks. A plurality of test data elements are generated according to each of the plurality of functional blocks. Test data including one or more of such test data elements stored in one or more test data areas is prepared. Based on the test data, reference data and processed data are generated. By comparing the processed data with the reference data, the defect of the inspected apparatus is detected.

88 Claims, 9 Drawing Sheets

DETECTING A DEFECTIVE AREA OF AN INSPECTED APPARATUS

CROSS-REFERENCE TO RELATED APPLICATIONS

This patent specification is based on Japanese patent application, No. JPAP2003-405575 filed on Dec. 4, 2003, in the Japanese Patent Office, the entire contents of which are incorporated by reference herein.

BACKGROUND OF THE INVENTION

1. Field of the Invention

The present invention relates to determining acceptability and detecting a defective area of an inspected apparatus having a plurality of functional blocks.

2. Discussion of the Background

To inspect an apparatus, device, and/or integrated circuit (hereinafter, collectively referred to as the "inspected apparatus") having a plurality of functional blocks, test data is input to the inspected apparatus causing the inspected apparatus to generate processed data. The processed data is then compared to reference data having an expected value reflecting processed data of an acceptable inspected apparatus. Based on the comparison, the acceptability of the inspected apparatus is determined.

To further detect which of the functional blocks is attributable to a defect, the above determination process is performed for each functional block, for example, by temporarily stopping operations of the functional blocks not being inspected.

SUMMARY OF THE INVENTION

Exemplary embodiments of the present invention provide an inspecting apparatus, system, method, computer program and/or product for detecting a defect of an inspected apparatus having a plurality of functional blocks, for example, by specifying one of the functional blocks that may be attributable to the defect.

For example, a plurality of test data elements is generated according to each of the plurality of functional blocks. Test data storing one or more of such test data elements in one or more test data areas is prepared. Correspondence between the test data element and the test data area may be determined previously or at the time of the inspection.

Based on the test data, reference data storing one or more reference data elements and processed data storing one or more processed data elements are respectively generated. The processed data is then compared with the reference data to generate a comparison result. Based on the comparison result, a defect of the inspected apparatus is detected to determine acceptability or defectiveness of the inspected apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
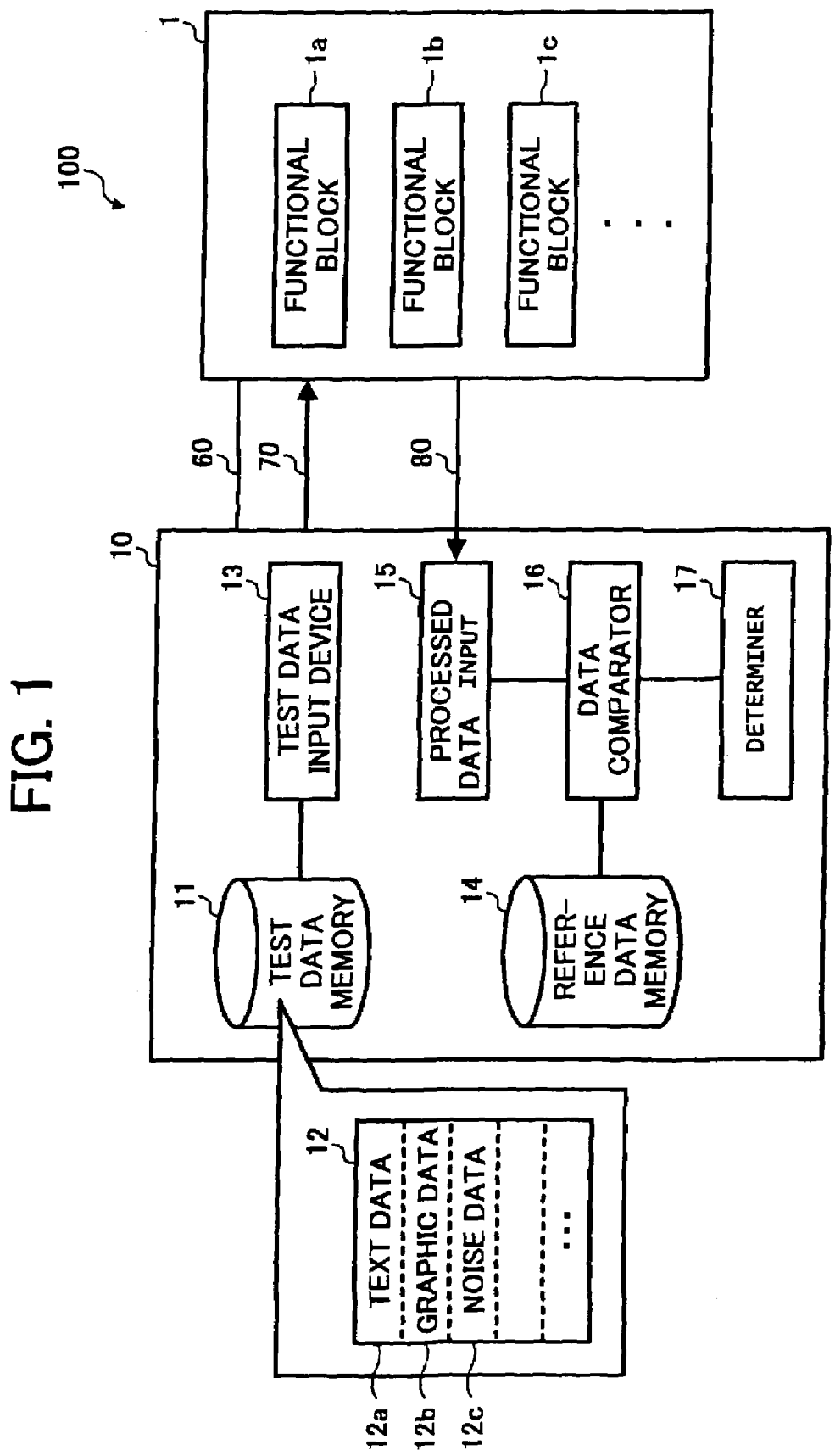
FIG. 1 is a block diagram illustrating a functional structure of an inspecting system according to a preferred embodiment of the present invention.

In describing preferred embodiments illustrated in the drawings, specific terminology is employed for the sake of clarity. However, the disclosure of this patent specification is not intended to be limited to the specific terminology selected and it is to be understood that each specific element includes all equivalents that operate in a similar manner.

Referring now to the drawings, wherein like reference numerals designate identical or corresponding parts throughout the several views, particularly to FIG. 1, a description is made of an inspecting system 100 according to a preferred embodiment of the present invention.

The inspecting system 100 includes an inspecting apparatus 10 and an inspected apparatus 1, connected to each other through a controller line 60, an input data line 70, and an output data line 80. The controller line 60 includes an interface, allowing the inspecting apparatus 10 to send a control signal for activating the inspected apparatus 1. The input data line 70 includes an interface for carrying data from the inspecting apparatus 10 to the inspected apparatus 1. The output data line 80 includes an interface for carrying data from the inspected apparatus 1 to the inspecting apparatus 10.

The inspecting apparatus 10 is capable of inspecting, analyzing, checking, and/or determining acceptability or defectiveness of the inspected apparatus 1.

The inspected apparatus 1 may include a circuit board, or any other suitable device and/or apparatus, having a plurality of functional blocks, each providing a specific function. The number of functional blocks and the function given by each functional block define general characteristics of the inspected apparatus 1.

For illustrative purposes, the following describes the exemplary cases of inspecting an image processing apparatus, such as a copier, facsimile, printer, computer, and multifunctional apparatus, for example. To operate as the image processing apparatus, the inspected apparatus 1 of FIG. 1 includes at least three functional blocks 1a, 1b, and 1c, with each functional block providing a specific image processing function.

For example, the functional block 1a provides a function of controlling a text data element ("text data function"). The text data element includes any kind of data having characters, symbols, numerals, etc. The functional block 1b provides a function of controlling a graphic data element ("graphic data function"). The graphic data element includes any kind of data having pictures, drawings, etc. The functional block 1c provides a function of controlling a noise data element ("noise data function"). The noise data element includes any kind of irrelevant or meaningless data often generated through image processing, such as a film scratch and dust.

Although not illustrated in FIG. 1, the inspected apparatus 1 may include other functional blocks, including a functional block providing a function of controlling a confidential data element. The confidential data element includes data requiring a high level of confidentiality, such as money or securities, for example. Alternatively, the inspected apparatus 1 may include any combination or number of the above-described functional blocks 1a to 1c.

As shown in FIG. 1, the inspecting apparatus 10 includes a test data memory 11, a test data input device 13, a reference data memory 14, a processed data input 15, a data comparator 16, and a determiner 17.

The test data memory 11 stores test data 12, which includes various types of test data elements to be used for inspecting at least one of the functional blocks 1a to 1c of the inspected apparatus 1. Further, the respective data elements are stored in respective data areas of the test data 12.

For example, the test data 12 includes a test data element to be used for inspecting the text data function of the functional block 1a ("test text data element") in a test text data area 12a, a test data element to be used for inspecting the graphic data function of the functional block 1b ("test graphic data element") in a test graphic data area 12b, and a test data element to be used for inspecting the noise data function of the functional block 1c ("test noise data element") in a test noise data area 12c. Alternatively, the test data memory 11 may store the respective test data elements and location information indicating the respective locations of the respective test data elements in the test data 12. The location information may be expressed in XY coordinate system, for example.

For example, the test data memory 11 may read out the test data 12 from a paper document or from a recording medium such as an optical medium. In yet another example, the test data memory 11 may obtain the test data 12 from an external processing device through a network.

The reference data memory 14 stores prior reference data corresponding to the test data 12. More specifically, the reference data includes a reference data element generated based on the test text data element ("reference text data element") in a reference text data area, a reference data element generated based on the test graphic data element ("reference graphic data element") in a reference graphic data area, and a reference data element generated based on the test noise data element ("reference noise data element") in a reference noise data area.

Preferably, the reference text data area may be located in the area corresponding to the test text data area, by referring to the location information stored in the test data memory 11. Similarly, the reference graphic data area and the reference noise data area may be located in the area corresponding to the test graphic data area, and the area corresponding to the test noise data area, respectively.

The reference data may be prepared by inputting the test data 12 to any kind of circuit board, device, or apparatus, which has the same function as the inspected apparatus 1 and operates properly. Alternatively, the reference data may be prepared using any known simulation model.

The test data input device 13 reads out the test data 12 from the test data memory 11, and inputs it to the inspected apparatus 1 through the input data line 70. Subsequently, the test data input device 13 may activate the inspected apparatus 1, by sending the control signal through the controller line 60, for example.

Using the test data 12, the inspected apparatus 1 generates processed data. The processed data includes a processed data element generated based on the test text data element ("processed text data element") in a processed text data area, a processed data element generated based on the test graphic data element ("processed graphic data element") in a processed graphic data area, and a processed data element generated based on the test noise data element ("processed noise data element") in a processed noise data area.

Preferably, the processed text data area may be located in the area corresponding to the test text data area, by referring the location information stored in the test data memory 11. Similarly, the processed graphic data area and the processed noise data area may be located in the area corresponding to the test graphic data area, and the area corresponding to the test noise data area, respectively.

The processed data obtainer 15 obtains the processed data from the inspected apparatus 1 through the output data line 80.

The data comparator 16 obtains the processed data from the processed data input 15, and the reference data from the reference data memory 12. The data comparator 16 then compares the processed data with the reference data, and generates a comparison result. More specifically, the data comparator 16 compares the processed text data element with the reference text data element, the processed graphic data element with the reference graphic data element, and the processed noise data element with the reference processed data element. The data comparator 16 then generates a comparison result indicating whether the processed data including the processed text data element, the processed graphic data element, and the processed noise data element, matches with the reference data including the reference text data element, the reference graphic data element, and the reference noise data element respectively.

The determiner 17 determines whether the inspected apparatus 1 is acceptable or defective based on the comparison result. For example, when the comparison result indicates that the processed data matches with the reference data, the determiner 17 determines that the inspected apparatus 1 is acceptable. Otherwise, the determiner 17 determines that the inspected apparatus 1 is defective. More specifically, the determiner 17 accepts the inspected apparatus 1, if each of the processed data elements matches with the corresponding one of the reference data elements.

Figure 2:
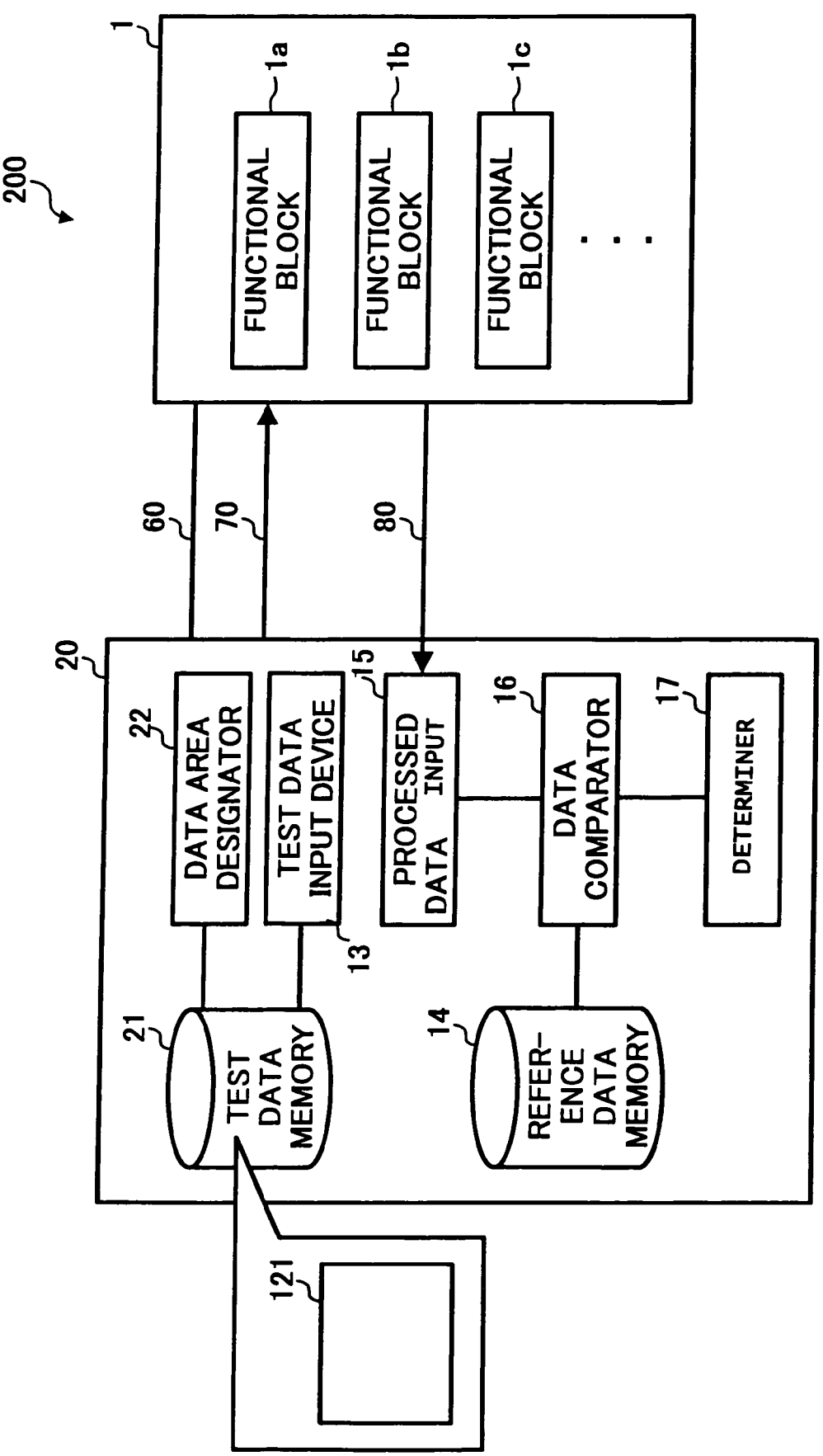
FIG. 2 is a block diagram illustrating a functional structure of an inspecting system according to another preferred embodiment of the present invention.

Referring to FIG. 2, an inspecting system 200 according to another preferred embodiment of the present invention is explained.

The inspecting system 200 is substantially similar in structure and operation to the inspecting system 100, except that the inspecting apparatus 10 is replaced with the inspecting apparatus 20.

As shown in FIG. 2, the inspecting apparatus 20 includes a test data memory 21, a data area designator 22, the test data input device 13, the reference data memory 14, the processed data input 15, the data comparator 16, and the determiner 17.

The test data memory 21 stores test data 121. The test data 121 includes the test text data element, the test graphic data element, and the test noise data element, however, the respective locations of the test data elements are not previously specified as the test data 12.

The data area designator 22 assigns test data areas to the test data elements, respectively. For example, the data area designator 22 specifies the location of the test text data element, and stores information indicating the location in the test data memory 21 in a manner corresponding to the test text data element. Similarly, the data area designator 22 specifies the location of the test graphic data element, and stores information indicating the location in the test data memory 21 in a manner corresponding to the test graphic data element. Further, the data area designator 22 specifies the location of the test noise data element, and stores information indicating the location in the test data memory in a manner corresponding to the test noise data element.

Alternatively, the above-described function of the data area designator 22 may be performed by the inspected apparatus 1, if the inspected apparatus 1 is capable of performing such function.

Further, the inspecting apparatus 20 may store the test data 12 in the test data memory 21.

Figure 3:
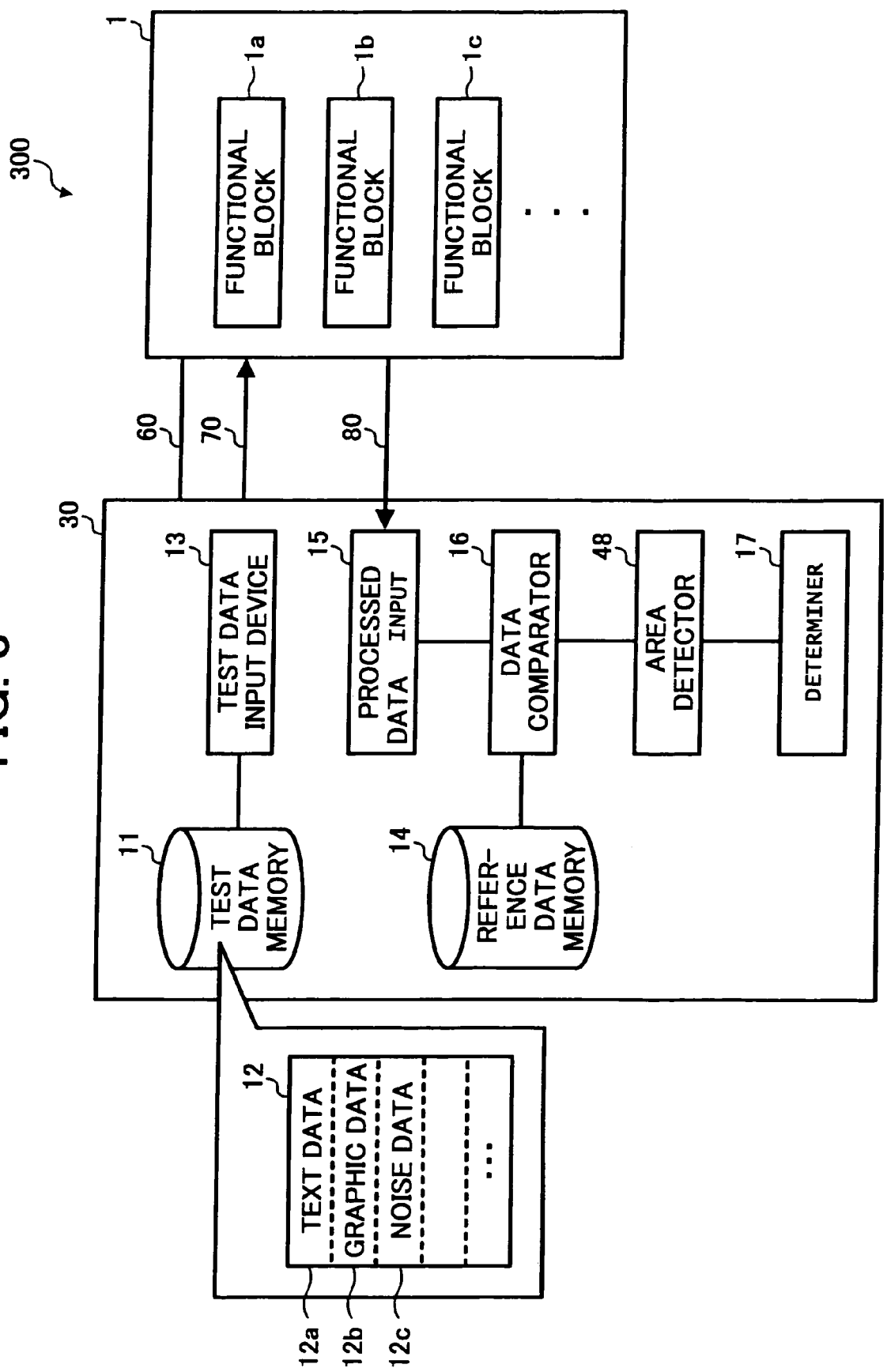
FIG. 3 is a block diagram illustrating a functional structure of an inspecting system according to another preferred embodiment of the present invention.

Referring to FIG. 3, an inspecting system 300 according to another preferred embodiment of the present invention is explained.

The inspecting system 300 is substantially similar in structure and operation to the inspecting system 100, except for the inspecting apparatus 30.

As illustrated in FIG. 3, the inspecting apparatus 30 includes the test data memory 11, the test data input device 13, the reference data memory 14, the processed data input 15, the data comparator 16, an area detector 48, and the determiner 17.

The area detector 48 stores correspondence information indicating correspondence between the test data areas and the functional blocks. More specifically, the area detector 48 stores information indicating that the test text data area corresponds to the functional block 1a, information indicating that the test graphic data area corresponds to the functional block 1b, and information indicating that the test noise data area corresponds to the functional block 1c. With this correspondence information, the determinator 17 detects which one of the functional blocks 1a to 1c may be attributable to a defect, after having determined that the inspected apparatus 1 is defective.

For example, if the comparison result of the data comparator 16 indicates that the processed text data element differs from the reference text data element, the determiner 17 specifies the location of the test text data area storing the test text data element, by referring to the location information stored in the test data memory 11. Once the location of the test text data area is specified, the determinator 17 detects the functional block, which may be responsible for the test text data area, by referring to the correspondence information stored in the area detector 48.

In another example, if the comparison result of the data comparator 16 indicates that none of the processed data elements matches with the corresponding one of the reference data elements, the determiner 17 may indicate that the defect is attributable to one or more functional blocks other than the functional blocks 1a to 1c. In other words, the defect may be attributable to the basic function of the inspected apparatus 1, rather than its image processing function performed by the functional blocks 1a to 1c.

Figure 4:
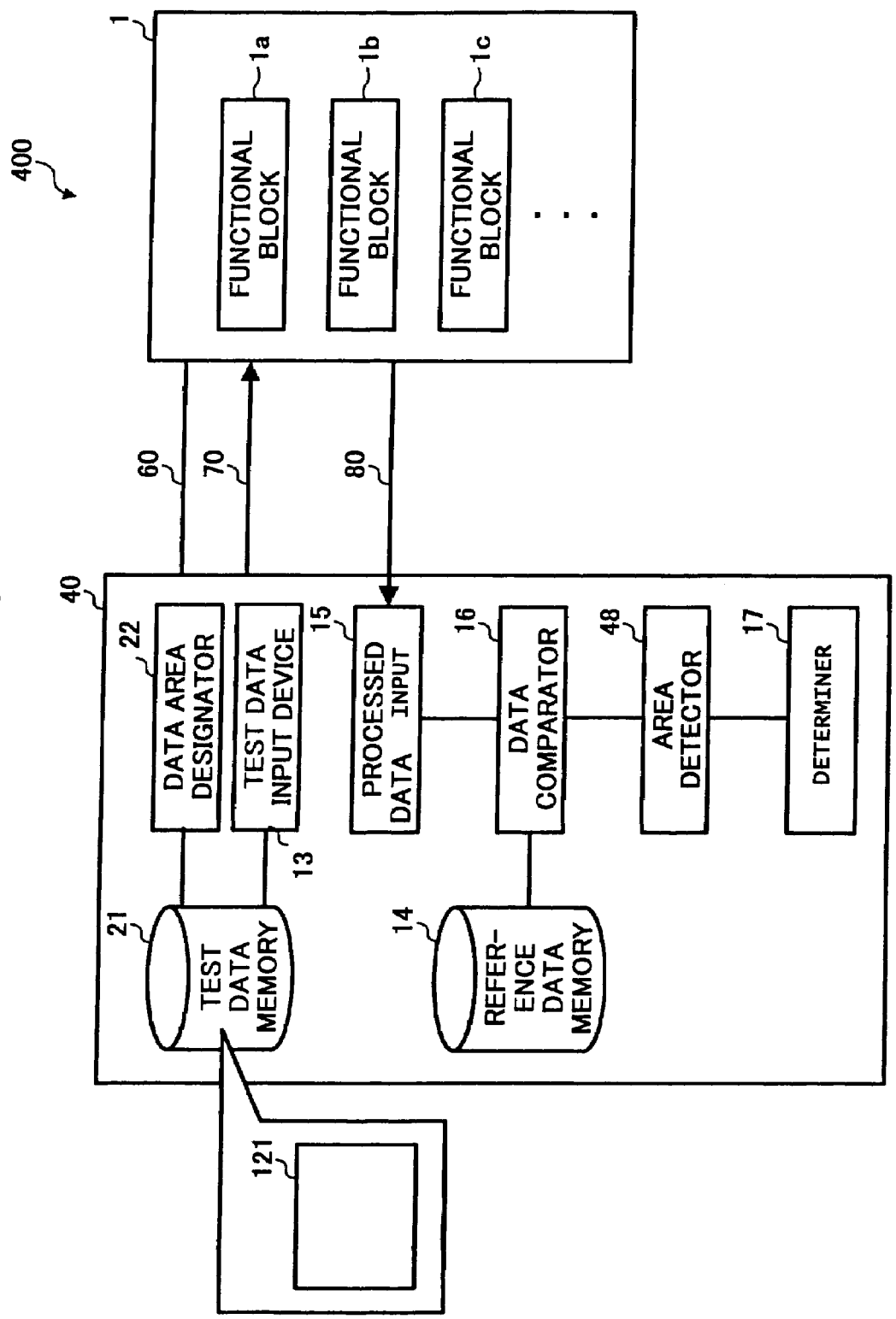
FIG. 4 is a block diagram illustrating a functional structure of an inspecting system according to another preferred embodiment of the present invention.

Referring to FIG. 4, an inspecting system 400 according to another preferred embodiment of the present invention is explained.

The inspecting system 400 is similar in structure and operation to the inspecting system 200, except for the inspecting apparatus 40.

As illustrated in FIG. 4, the inspecting apparatus 40 includes the test data memory 21, the data area designator 22, the test data input device 13, the reference data memory 14, the processed data input 15, the data comparator 16, the area detector 48, and the determiner 17.

With this configuration, the inspecting apparatus 40 is capable of specifying which one of the functional blocks 1a to 1c most likely contributes to the defect of the inspected apparatus 1. Further, the inspecting apparatus 40 may determine that the defect is attributable to the basic function of the inspected apparatus 1, as described above referring to FIG. 3.

Figure 5:
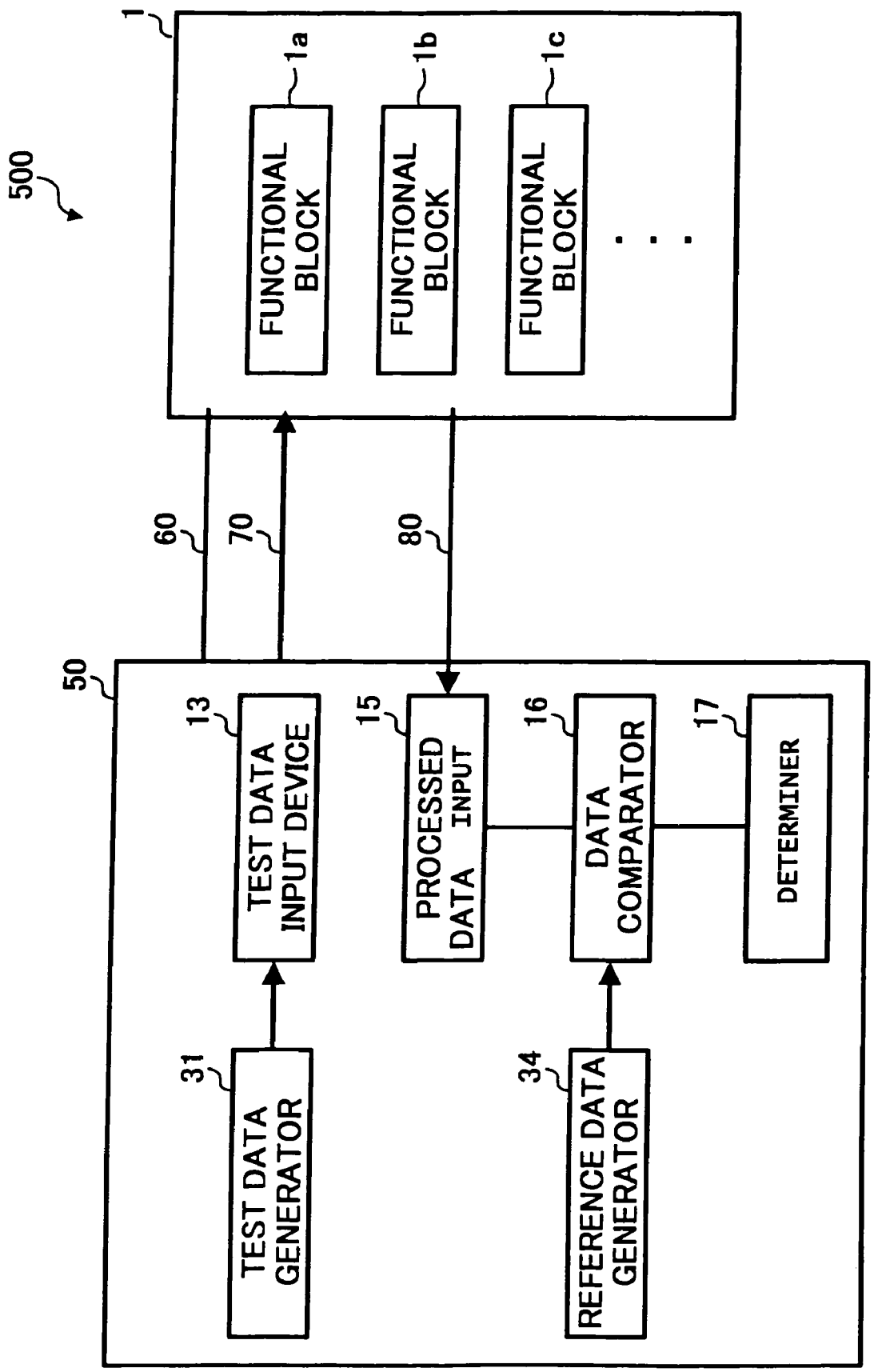
FIG. 5 is a block diagram illustrating a functional structure of an inspecting system according to another preferred embodiment of the present invention.

Referring to FIG. 5, an inspecting system 500 according to another preferred embodiment of the present invention is explained.

The inspecting system 500 is similar in structure and operation to the inspecting system 100, except for the inspecting apparatus 50.

The inspecting apparatus 50 includes a test data generator 31, a reference data generator 34, the test data input device 13, the processed data input 15, the data comparator 16, and the determiner 17.

With the test data generator 31 and the reference data generator 34, the inspecting apparatus 50 provides an additional function of generating the test data and the reference data.

In operation, the test data generator 31 obtains function information indicating the functional blocks used by the inspected apparatus 1 for image processing. Based on the function information, the test data generator 31 generates the test data 12. Specifically, the test data generator 31 obtains the function information that the inspected apparatus 1 uses the functional blocks 1a to 1c. Based on the function information, the test data generator 31 generates the test text data element, the test graphic data element, and the test noise data element.

The test data generator 31 may additionally generate data elements other than the above-described data elements. In such a case, the test data input device 13 may extract the above-described data elements according to the function information.

The reference data generator 34 generates the reference data corresponding to the test data generated by the test data generator 31, for example, by using a normally-operated apparatus having the same function of the inspected apparatus 1.

In another example, the inspecting apparatus 50 may additionally include the data area designator 22. In such a case, the test data memory 11 is replaced with the test data memory 21, which stores the test data 121.

In yet another example, the inspecting apparatus 50 may additionally include the area detector 48. In such a case, the inspecting system 500 operates similarly to the inspecting system 300.

In yet another example, the inspecting apparatus 50 may additionally include the data area designator 22 and the area detector 48. In such a case, the inspecting system 500 operates similarly to the inspecting system 400.

In any one of the above-described embodiments, the inspecting apparatus and the inspected apparatus are connected through the controller line 60, the input data line 70, and the output data line 80, however, the present invention is not limited to such examples. For example, the lines 60, 70, and 80 may be integrated into one line, as long as the integrated line operates in a similar manner.

Figure 6:
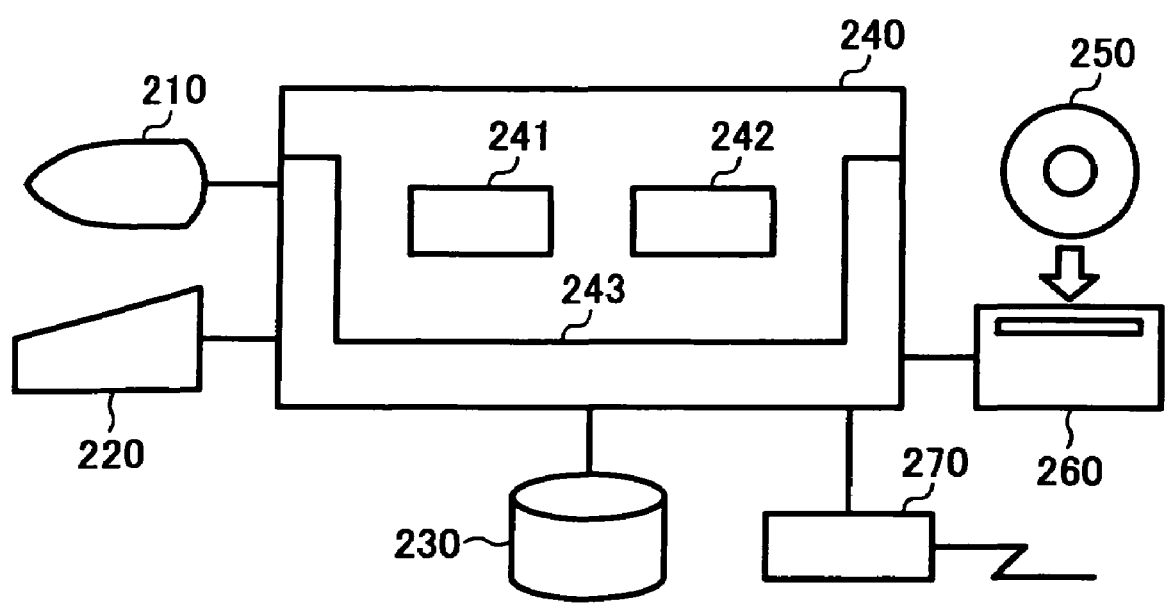
FIG. 6 is a block diagram illustrating a hardware structure of an inspecting system according to a preferred embodiment of the present invention.

Any one of the above and other embodiments of the present invention may be implemented as an inspecting system 600 having a hardware structure shown in FIG. 6, for example.

The inspecting system 600 includes a processing device 240 provided with a controller 241, a main memory 242, an interface 243, a display device 210, an input device 220, a storage device 230, a communication device 270, a recording medium 250, and a recording medium reader 260.

The controller 241 includes any kind of processor, such as a central processing unit, capable of controlling an entire operation of the inspecting system 600.

The memory 242 includes any kind of memory capable of operating as a work memory for the controller 241.

The interface 243 includes any kind of interface, such as a serial, parallel, or analog interface, capable of facilitating input and/or output of information between the processing device 240 and the outside.

The storage device 230 includes any kind of storage device, such as a hard disk drive. The storage device 230 may store instructions for causing the controller 241 to operate according to the present invention in a manner readable to the controller 241.

The display 210 includes any kind of display device, such as a CRT (cathode ray tube) or an LCD (liquid crystal display), capable of displaying the instructions and/or data to be used by the controller 241.

The input device 220 includes any kind of input device, such as a mouse and a keyboard, allowing a user to input instructions to the controller 241.

The recording medium 250 includes any kind of recording medium, such as CDs (compact discs), DVDs (digital video discs), a floppy disk, a magneto-optical disk, for example. The recording medium 250 may store the instructions for causing the controller 241 to operate according to the present invention. Further, the recording medium 250 may store data, which can be used by the controller 241, such as the test data.

The recording medium reader 260 includes any kind of device capable of reading the instructions from the recording medium 250. Further, the recording medium reader 260 may additionally have a function of writing data or instructions onto the recording medium 250.

The communication device 270 includes any kind of communication device, such as an LAN (local area network) card or a modem, having a function of allowing the processor 240 to communicate with other devices, preferably through a network. Using the communication device 270, the processor 240 may download the instructions from the outside system.

As will be apparent to those skilled in the art, the processor 240 may be implemented as a general-purpose processor, such as a computer. In such a case, the other devices connected to the processor 240 may be referred to as peripheral devices. However, the present invention is not limited to this exemplary case. For example, some of the peripheral devices may not be provided, or some of the functions or operations provided by the inspecting system 600 may be carried over a network.

Figure 7:
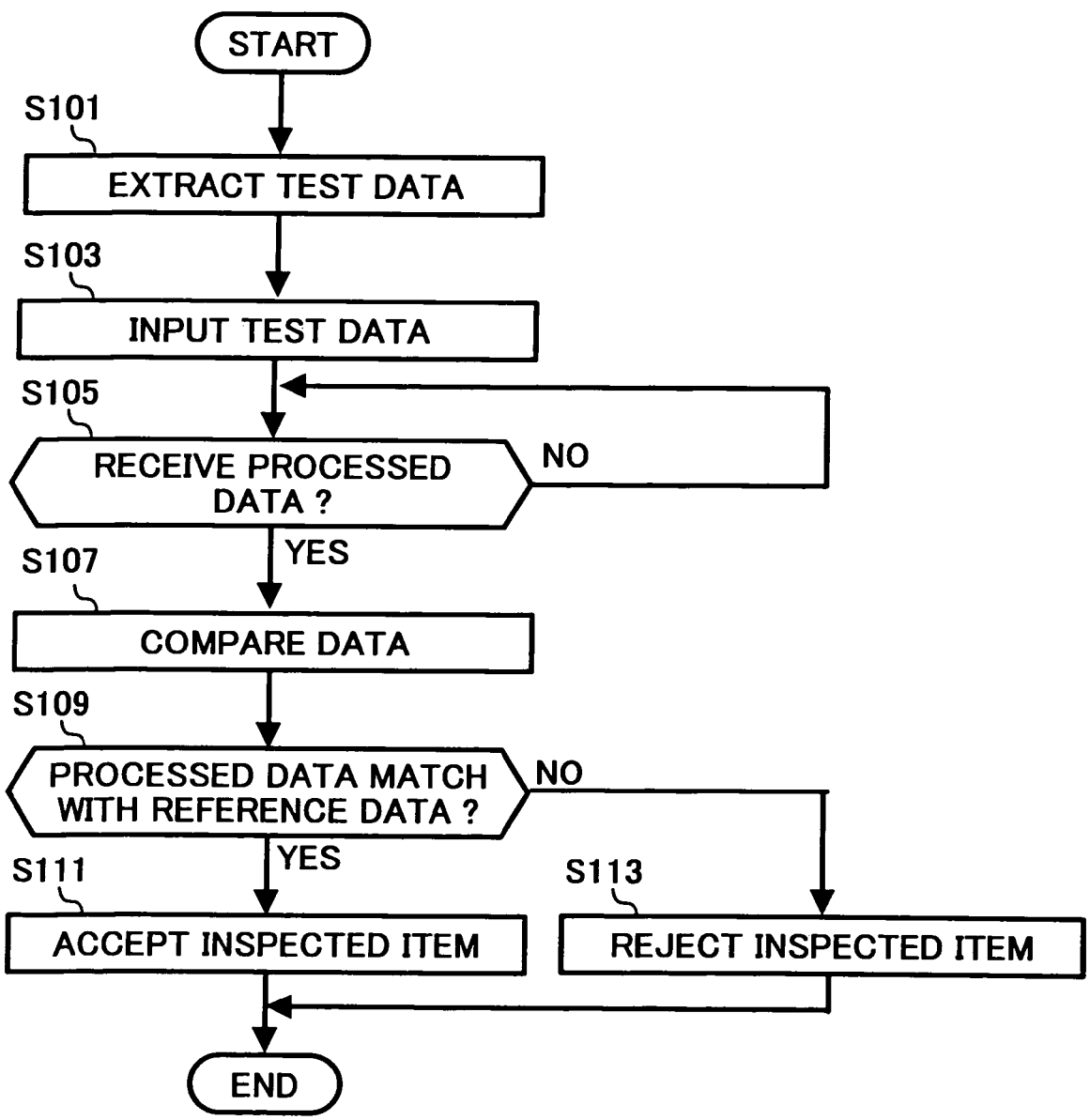
FIG. 7 is a flowchart illustrating the inspection of an apparatus according to a preferred embodiment of the present invention.

Now, referring to FIG. 7, an exemplary inspection performed by the inspecting system 600 is explained. The inspecting system 600 is assumed to operate as any one of the inspecting systems 100 and 200.

In this exemplary case, the controller 241 performs the operations illustrated in FIG. 7, according to the instructions stored in the storage device 230 or the recording medium 250. More specifically, when the recording medium reader 260 reads out the instructions from the recording medium 250, the instructions are stored onto the storage device 230. Subsequently, when the controller 241 is activated, the instructions stored in the storage device 230 are loaded onto the main memory 242. At the same time, the controller 241 starts operating according to the instructions.

In Step S101, the controller 241 extracts the test data. In this case, the controller 241 may select one or more test data elements to be used for inspection from a plurality of test data elements previously stored in the storage device 230 or the recording medium 250. Further, the test data may include the test data 12 or the test data 121.

In Step S103, the controller 241 inputs the test data to the inspected apparatus 1. Upon receiving the test data, the inspected apparatus 1 generates the processed data corresponding to the test data.

Step S105 determines whether the controller 241 receives the processed data from the inspected apparatus 1. If yes, the process moves to Step S107, otherwise, the process repeats Step S105.

In Step S107, the controller 241 obtains the reference data corresponding to the test data, and compares the processed data with the reference data. For example, the controller 241 compares the processed text data element with the reference text data element, the processed graphic data element with the reference graphic data element, and the processed noise data element with the reference noise data element.

Step S109 determines whether the processed data matches with the reference data. If yes, the process moves to Step S111 to accept the inspected apparatus 1. If no, the process moves to Step S113 to reject the inspected apparatus 1. For example, if at least one of the processed data elements differs from the corresponding one of the reference data elements, the controller 241 determines that the processed data does not match with the reference data, and further determines that the inspected apparatus 1 is defective.

Figure 8:
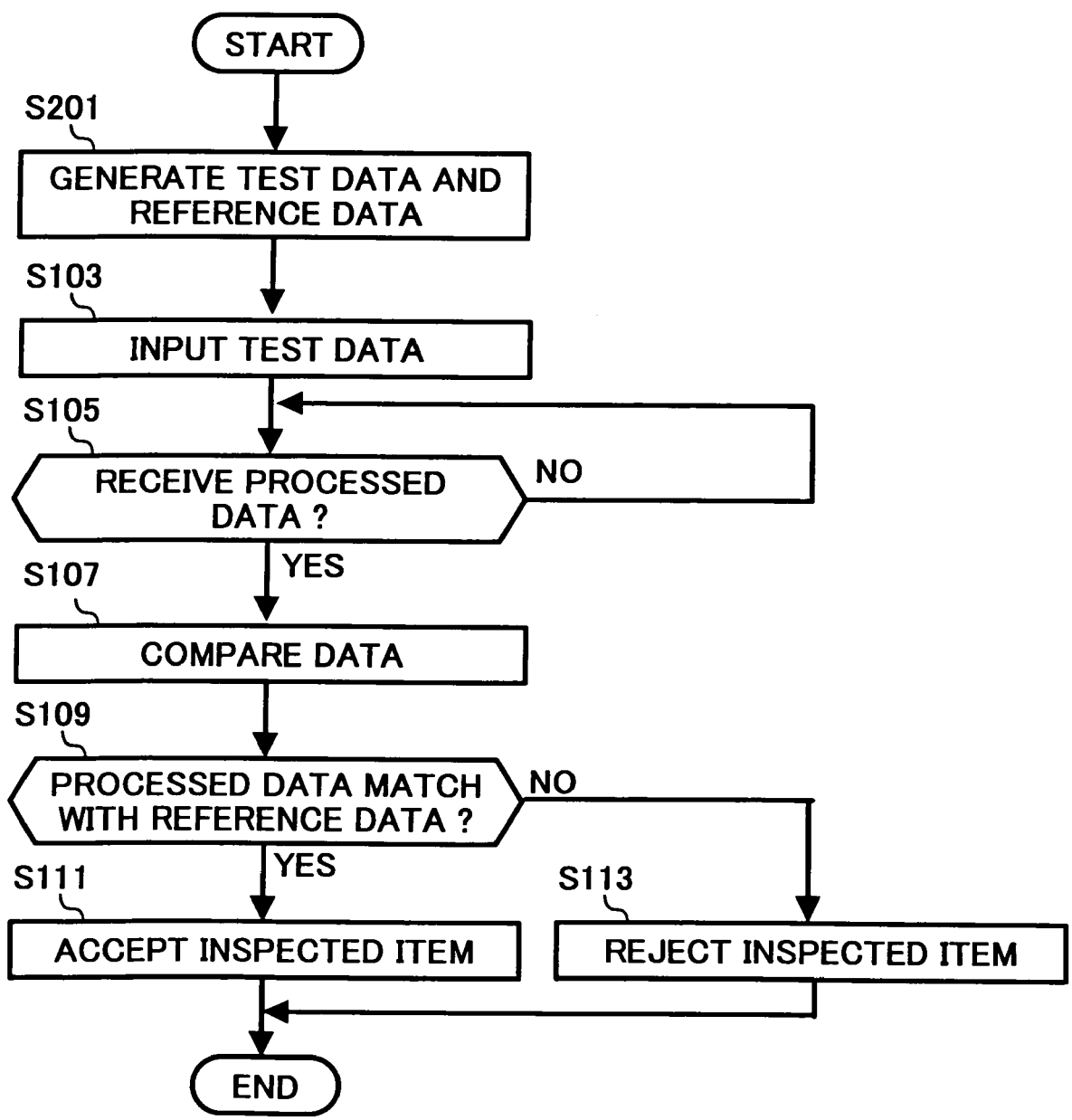
FIG. 8 is a flowchart illustrating the inspection of an apparatus according to another preferred embodiment of the present invention.

Now, referring to FIG. 8, another exemplary inspection performed by the inspecting system 600 is explained. The inspecting system 600 is assumed to operate as the inspecting system 500 or any other inspecting system capable of generating the test data and the reference data according to the present invention.

The operations illustrated in FIG. 8 are substantially similar to the operations illustrated in FIG. 7, except that Step S101 is replaced with Step S201.

In Step S201, the controller 241 generates the test data. In this case, the controller 241 may specify at least one of the functional blocks included in the inspected apparatus 1, and generate one or more test data elements to be used for inspecting the specified functional blocks.

Figure 9:
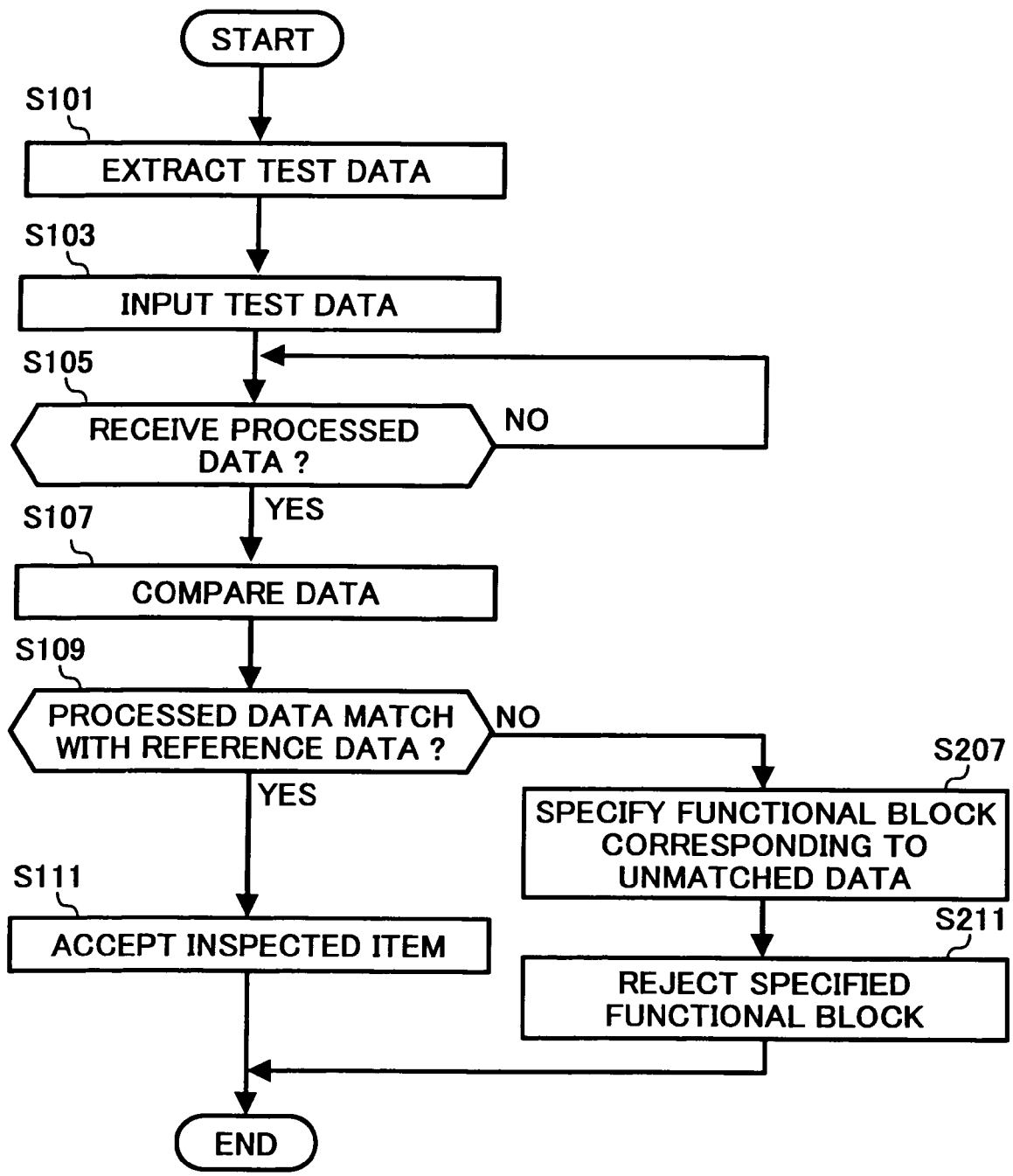
FIG. 9 is a flowchart illustrating the inspection of an apparatus according to another preferred embodiment of the present invention.

Now, referring to FIG. 9, another exemplary inspection performed by the inspecting system 600 is explained. The inspecting system 600 is assumed to operate as any one of the inspecting systems 300 and 400.

The operations illustrated in FIG. 9 are substantially similar to the operations illustrated in FIG. 7, except for the addition of Step S207 and Step S211.

In Step S207, the controller 241 specifies the functional block corresponding to the unmatched data area, which may be attributable to the defect of the inspected apparatus 1.

In Step S211, the controller 241 determines that the specified functional block is defective, and further, specifies the inspected apparatus 1 as defective.

Numerous additional modifications and variations are possible in light of the above teachings. It is therefore to be understood that within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims.

What is claimed is:

1. An inspecting apparatus for inspecting an apparatus having a plurality of functional blocks, comprising:
   a test data input device configured to obtain test data including one or more test data elements stored in predetermined test storage areas that correspond to at least one of the plurality of functional blocks;
   an interface configured to input the test data to the inspected apparatus causing the inspected apparatus to generate processed data corresponding to the test data;
   a data comparator configured to obtain the processed data from the inspected apparatus and reference data indicating an expected value of the processed data, and compare the processed data with the reference data to generate a comparison result; and
   a determiner configured to determine acceptability of the inspected apparatus based on the comparison result,
   wherein said test data includes a test text data element, a test graphic data element and a test noise data element.

2. The inspecting apparatus of claim 1, further comprising:
   a processed data input configured to obtain the processed data from the inspected apparatus and to provide the processed data to the data comparator.

3. The inspecting apparatus of claim 1, further comprising:
   a test data memory configured to store the test data.

4. The inspecting apparatus of claim 3, further comprising:
   a reference data memory configured to store the reference data.

5. The inspecting apparatus of claim 1, further comprising:
   a reference data memory configured to store the reference data.

6. The inspecting apparatus of claim 1, further comprising:
   a test data generator configured to select one or more of the plurality of functional blocks for inspection, and generate test data corresponding to the one or more of the plurality of functional blocks.

7. The inspecting apparatus of claim 6, further comprising:
   a reference data generator configured to generate the reference data.

8. The inspecting apparatus of claim 1, further comprising:
   a reference data generator configured to generate the reference data.

9. The inspecting apparatus of claim 1, wherein the reference data includes one or more reference data elements stored in one or more predetermined reference data storage areas.

10. The inspecting apparatus of claim 9, wherein each of the one or more predetermined reference data storage areas corresponds to areas where the test data is stored.

11. The inspecting apparatus of claim 9, wherein the processed data includes one or more processed data elements stored in one or more predetermined processed data storage areas.

12. The inspecting apparatus of claim 11, wherein each of the one or more predetermined processed data storage areas corresponds to the predetermined test areas where the test data is stored.

13. The inspecting apparatus of claim 12, wherein each of the one or more predetermined reference data areas corresponds to the predetermined test areas where the test data is stored.

14. The inspecting apparatus of claim 11, wherein:
   the data comparator is configured to compare each of the one or more processed data elements with a corresponding one of the one or more reference data elements.

15. The inspecting apparatus of claim 14, wherein:
   the determiner is configured to determine that the inspected apparatus is acceptable when the comparison result indicates that each of the one or more processed data elements matches with the corresponding one of the one or more reference data elements.

16. The inspecting apparatus of claim 14, wherein:
   the determiner is configured to determine that the inspected apparatus is defective when the comparison result indicates that at least one of the one or more processed data elements differs from the corresponding one of the one or more reference data elements.

17. The inspecting apparatus of claim 16, wherein:
   the determiner is configured to detect a defect of the inspected apparatus.

18. The inspecting apparatus of claim 17, wherein:
   the determiner is configured to detect one of the one or more test data elements attributable to the defect based on the comparison result, and to detect one of the predetermined test data storage areas having the detected test data element.

19. The inspecting apparatus of claim 18, further comprising:
   an area detector configured to store correspondence information between the predetermined test data storage areas and the functional blocks,
   wherein the determiner is configured to detect one of the functional blocks attributable to the defect based on the detected predetermined test data storage area.

20. The inspecting apparatus of claim 17, further comprising:
   an area detector configured to store correspondence information between the predetermined test data storage areas and the functional blocks,
   wherein the determiner is configured to detect one of the functional blocks attributable to a defect based on the comparison result and the correspondence information.

21. The inspecting apparatus of claim 1, wherein the processed data includes one or more processed data elements stored in one or more predetermined processed data storage areas.

22. The inspecting apparatus of claim 21, wherein each of the one or more predetermined processed data storage areas corresponds to predetermined test areas where the test data is stored.

23. The inspecting apparatus of claim 1, wherein:
   the determiner is configured to determine that the inspected apparatus is acceptable when the comparison result indicates that the processed data matches with the reference data.

24. The inspecting apparatus of claim 1, wherein:
the test data input device is configured to obtain the test data from a recording medium.

25. The inspecting apparatus of claim 1, wherein:
the test data input device is configured to obtain the test data via a network.

26. An inspecting apparatus for inspecting an apparatus having a plurality of functional blocks, comprising:
a test data input device configured to obtain test data including one or more test data elements generated according to a selected one of the plurality of functional blocks;
an interface configured to input the test data to the inspected apparatus causing the inspected apparatus to generate processed data corresponding to the test data;
a data area designator configured to respectively assign test data areas to the one or more test data elements;
a data comparator configured to obtain the processed data from the inspected apparatus and reference data indicating an expected value of the processed data, and to compare the processed data with the reference data to generate a comparison result; and
a determiner configured to determine acceptability of the inspected apparatus based on the comparison result,
wherein said test data includes a test text data element, a test graphic data element and a test noise data element.

27. The inspecting apparatus of claim 26, further comprising:
a processed data input configured to obtain the processed data from the inspected apparatus and to provide the processed data to the data comparator.

28. The inspecting apparatus of claim 26, further comprising:
a test data memory configured to store the test data.

29. The inspecting apparatus of claim 28, further comprising:
a reference data memory configured to store the reference data.

30. The inspecting apparatus of claim 26, further comprising:
a reference data memory configured to store the reference data.

31. The inspecting apparatus of claim 26, further comprising:
a test data generator configured to select one or more of the plurality of functional blocks for inspection and generate the one or more test data elements corresponding to the one or more of the plurality of functional blocks.

32. The inspecting apparatus of claim 31, further comprising:
a reference data generator configured to generate the reference data.

33. The inspecting apparatus of claim 26, further comprising:
a reference data generator configured to generate the reference data.

34. The inspecting apparatus of claim 26, wherein the reference data includes one or more reference data elements stored in one or more predetermined reference data storage areas.

35. The inspecting apparatus of claim 34, wherein each of the one or more predetermined reference data areas corresponds to one or more test data storage areas.

36. The inspecting apparatus of claim 34, wherein the processed data includes one or more processed data elements stored in one or more predetermined processed data storage areas.

37. The inspecting apparatus of claim 36, wherein each of the one or more predetermined processed data storage areas corresponds to each of the predetermined test data storage areas.

38. The inspecting apparatus of claim 37, wherein each of the one or more reference data storage areas corresponds to each of the one or more predetermined test data storage areas.

39. The inspecting apparatus of claim 36, wherein:
the data comparator is configured to compare each of the one or more processed data elements with a corresponding one of the one or more reference data elements.

40. The inspecting apparatus of claim 39, wherein:
the determiner is configured to determine that the inspected apparatus is acceptable, when the comparison result indicates that each of the one or more processed data elements matches with the corresponding one of the one or more reference data elements.

41. The inspecting apparatus of claim 39, wherein:
the determiner is configured to determine that the inspected apparatus is defective, when the comparison result indicates that at least one of the one or more processed data elements differs from the corresponding one of the one or more reference data elements.

42. The inspecting apparatus of claim 41, wherein:
the determiner is configured to detect a defect of the inspected apparatus.

43. The inspecting apparatus of claim 42, wherein:
the determiner is configured to detect one of the one or more test data elements attributable to the defect based on the comparison result, and to detect one of the test data areas having the detected test data element.

44. The inspecting apparatus of claim 43, further comprising:
an area detector configured to store correspondence information between the one or more predetermined test data storage areas and the functional blocks,
wherein the determiner is configured to detect one of the functional blocks attributable to a defect based on the detected predetermined test data area.

45. The inspecting apparatus of claim 42, further comprising:
an area detector configured to store correspondence information between the one or more test data storage areas and the functional blocks,
wherein the determiner is configured to detect one of the functional blocks attributable to a defect based on the comparison result and the correspondence information.

46. The inspecting apparatus of claim 26, wherein the processed data includes one or more processed data elements stored in one or more predetermined processed data storage areas.

47. The inspecting apparatus of claim 46, wherein each of the one or more predetermined processed data storage areas corresponds to each of the predetermined test data storage areas.

48. The inspecting apparatus of claim 26, wherein:
the determiner is configured to determine that the inspected apparatus is acceptable, when the comparison result indicates that the processed data matches with the reference data.

49. The inspecting apparatus of claim 26, wherein:
the test data input device is configured to obtain the test data from a recording medium.

50. The inspecting apparatus of claim 26, wherein:
the test data input device is configured to obtain the test data via a network.

51. An inspecting apparatus for inspecting an apparatus having a plurality of functional blocks, comprising:
a test data input device configured to obtain test data including one or more test data elements stored in one or more predetermined test data storage areas, each of the one or more test data elements generated according to a selected one of the plurality of functional blocks;
an interface configured to input the test data to the apparatus to cause the apparatus to generate processed data corresponding to the test data;
a data area designator configured to specify correspondence between the one or more predetermined test data elements and the one or more test data storage areas;
a data comparator configured to obtain the processed data from the apparatus and reference data indicating an expected value of the processed data and compare the processed data with the reference data to generate a comparison result; and
a determiner configured to determine acceptability of the apparatus based on the comparison result,
wherein said test data includes a test text data element, a test graphic data element and a test noise data element.

52. The inspecting apparatus of claim 51, further comprising:
a processed data obtainer configured to obtain the processed data from the inspected apparatus and to provide the processed data to the data comparator.

53. The inspecting apparatus of claim 51, wherein:
the determiner is configured to determine that the inspected apparatus is defective when the comparison result indicates that the processed data differs from the reference data.

54. The inspecting apparatus of claim 53, wherein:
the determiner is configured to detect a defect of the inspected apparatus.

55. The inspecting apparatus of claim 54, wherein:
the determiner is configured to detect one of the one or more test data elements attributable to the defect based on the comparison result, and to detect one of the predetermined test data storage areas having the detected test data element.

56. The inspecting apparatus of claim 55, further comprising:
an area detector configured to store correspondence information between the predetermined test data storage areas and the functional blocks,
wherein the determiner is configured to detect one of the functional blocks attributable to the defect based on the detected test data storage area.

57. The inspecting apparatus of claim 54, further comprising:
an area detector configured to store correspondence information between the predetermined test data storage areas and the functional blocks,
wherein the determiner is configured to detect one of the functional blocks attributable to the defect based on the comparison result and the correspondence information.

58. An inspecting system for inspecting an inspected apparatus, comprising:
a storage device configured to store a plurality of instructions that when activated by a processor cause the processor to perform an inspection operation; and
the processor configured to:
obtain test data including a test data element stored in a test data area, the test data element generated according to a functional block of the inspected apparatus;
obtain processed data corresponding to the test data and reference data corresponding to the test data;
compare the processed data with the reference data to generate a comparison result; and
determine acceptability of the inspected apparatus based on the comparison result;
a reporting device configured to report the result of the determination of acceptability made by the processor,
wherein said test data includes a test text data element, a test graphic data element and a test noise data element.

59. The inspecting system of claim 58, wherein the processor is further configured to:
detect a defect of the inspected apparatus.

60. The inspecting system of claim 59, wherein the processor is further configured to:
specify a test data element attributable to the defect based on the comparison result; and
specify a test data storage area having the specified test data element.

61. The inspecting system of claim 60, wherein the processor is further configured to:
specify a functional block corresponding to the specified test data storage area.

62. The inspecting system of claim 59, wherein the processor is further configured to:
generate correspondence information indicating the correspondence between a test data storage area and the functional block.

63. The inspecting system of claim 62, wherein the processor is further configured to:
specify a functional block attributable to the defect based on the comparison result and the correspondence information.

64. An inspecting system for inspecting an apparatus, comprising:
a storage device configured to store a plurality of instructions that when activated by a processor cause the processor to perform an inspection operation; and
the processor configured to:
obtain test data including a test data element, the test data element generated according to a functional block of the inspected apparatus;
assign a test data storage area to the test data element;
obtaining processed data and reference data corresponding to the test data;
compare the processed data with the reference data to generate a comparison result; and
determine acceptability of the inspected apparatus based on the comparison result,
a reporting device configured to report the result of the determination of acceptability made by the processor,
wherein said test data includes a test text data element, a test graphic data element and a test noise data element.

65. The inspecting system of claim 64, wherein the processor is further configured to:
detect a defect of the inspected apparatus.

66. The inspecting system of claim 65, wherein the processor is further configured to:
specify a test data element attributable to the defect based on the comparison result; and
specify a test data storage area having the specified test data element.

67. The inspecting system of claim 66, wherein the processor is further configured to:
specify a functional block corresponding to the specified test data storage area.

68. The inspecting system of claim 65, wherein the processor is further configured to:
generate correspondence information indicating the correspondence between the test data storage area and the functional block.

69. The inspecting system of claim 68, wherein the processor is further configured to:
specify a functional block attributable to the defect based on the comparison result and the correspondence information.

70. An inspecting system for inspecting an apparatus, comprising:
a storage device configured to store a plurality of instructions that when activated by a processor cause the processor to perform an inspection operation; and
the processor configured to:
select a functional block of the inspected apparatus;
generate a test data element to be processed by the functional block;
provide test data including the test data element stored in a test data storage area;
providing processed data and reference data corresponding to the test data;
compare the processed data with the reference data to generate a comparison result; and
determine acceptability of the inspected apparatus based on the comparison result,
a reporting device configured to report the result of the determination of acceptability made by the processor,
wherein said test data includes a test text data element, a test graphic data element and a test noise data element.

71. The inspecting system of claim 70, wherein the processor is further configured to:
detect a defect of the inspected apparatus.

72. The inspecting system of claim 71, wherein the processor is further configured to:
specify a test data element attributable to the defect based on the comparison result; and
specify a test data storage area having the specified test data element.

73. The inspecting system of claim 72, wherein the processor is further configured to:
specify a functional block corresponding to the specified test data storage area.

74. The inspecting system of claim 71, wherein the processor is further configured to:
generate correspondence information indicating the correspondence between the test data storage area and the functional block.

75. The inspecting system of claim 74, wherein the processor is further configured to:
specify a functional block attributable to the defect based on the comparison result and the correspondence information.

76. A method for inspecting an apparatus, comprising:
obtaining test data that includes a test data element stored in a test data area, the test data element generated according to a functional block of the inspected apparatus;
obtaining processed data and reference data corresponding to the test data;
comparing the processed data with the reference data to generate a comparison result;
determining acceptability of the inspected apparatus based on the comparison result; and
reporting the result of the determining of the acceptability,
wherein said test data includes a test text data element, a test graphic data element and a test noise data element.

77. The method of claim 76, further comprising:
detecting a defect of the inspected apparatus.

78. A method for inspecting an apparatus, comprising:
obtaining test data including a test data element, the test data element generated according to a functional block of the inspected apparatus;
assigning a test data storage area to the test data element;
obtaining processed data and reference data corresponding to the test data;
comparing the processed data with the reference data to generate a comparison result;
determining acceptability of the inspected apparatus based on the comparison result; and
reporting the result of the determining of the acceptability,
wherein said test data includes a test text data element, a test graphic data element and a test noise data element.

79. The method of claim 78, further comprising:
detecting a defect of the inspected apparatus.

80. A method for inspecting an inspected apparatus, comprising:
selecting a functional block of the inspected apparatus;
generating a test data element to be processed by the functional block;
providing test data including the test data element stored in a test data area;
providing processed data and reference data corresponding to the test data;
comparing the processed data with the reference data to generate a comparison result;
determining acceptability of the inspected apparatus based on the comparison result; and
reporting the result of the determining of the acceptability,
wherein said test data includes a test text data element, a test graphic data element and a test noise data element.

81. The method of claim 80, further comprising:
detecting a defect of the inspected apparatus.

82. A computer program product comprising a computer readable storage medium storing a computer program code mechanism which when executed by a processor, causes the processor to perform a method for inspecting an item, comprising:
obtaining test data including a test data element stored in a test data area, the test data element generated according to a functional block of the inspected item;
obtaining processed data and reference data corresponding to the test data;
comparing the processed data with the reference data to generate a comparison result;
determining acceptability of the inspected item based on the comparison result; and
reporting the result of the determining of the acceptability,
wherein said test data includes a test text data element, a test graphic data element and a test noise data element.

83. The computer program product of claim 82, wherein the method further comprises: detecting a defect of the inspected item.

84. A computer program product stored on a computer readable storage medium storing a computer program code mechanism which when executed by a processor, causes the processor to perform a method for inspecting an item, comprising:
obtaining test data including a test data element, the test data element generated according to a functional block of the inspected item;
assigning a test data storage area to the test data element;
obtaining processed data and reference data corresponding to the test data;
comparing the processed data with the reference data to generate a comparison result;
determining acceptability of the inspected item based on the comparison result; and
reporting the result of the determining of the acceptability,
wherein said test data includes a test text data element, a test graphic data element and a test noise data element.

85. The computer program product of claim 84, wherein the method further comprises:
detecting a defect of the inspected item.

86. A computer program product stored on a computer readable storage medium storing a computer program code mechanism which when executed by a processor, causes the processor to perform a method for inspecting an item, comprising:
selecting a functional block of the inspected item;
generating a test data element to be processed by the functional block;
providing test data including the test data element stored in a test data area;
providing processed data and reference data corresponding to the test data;
comparing the processed data with the reference data to generate a comparison result;
determining acceptability of the inspected item based on the comparison result; and
reporting the result of the determining of the acceptability,
wherein said test data includes a test text data element, a test graphic data element and a test noise data element.

87. The computer program product of claim 86, wherein the method further comprises:
detecting a defect of the inspected item.

88. An inspecting apparatus for inspecting an apparatus having a plurality of functional blocks, comprising:
a test data input device configured to obtain test data including one or more test data elements stored in predetermined test storage areas that correspond to at least one of the plurality of functional blocks;
an interface configured to input the test data to the inspected apparatus causing the inspected apparatus to generate processed data corresponding to the test data;
a data comparator configured to obtain the processed data from the inspected apparatus and reference data indicating an expected value of the processed data, and compare the processed data with the reference data to generate a comparison result; and
a determiner configured to determine acceptability of the inspected apparatus based on the comparison result,
wherein the reference data includes one or more reference data elements stored in one or more predetermined reference data storage areas,
wherein the processed data includes one or more processed data elements stored in one or more predetermined processed data storage areas,
wherein the data comparator is configured to compare each of the one or more processed data elements with a corresponding one of the one or more reference data elements, and
wherein the determiner is configured to determine that the inspected apparatus is defective when the comparison result indicates that at least one of the one or more processed data elements differs from the corresponding one of the one or more reference data elements, to detect a defect of the inspected apparatus, to detect one of the one or more test data elements attributable to the defect based on the comparison result, and to detect one of the predetermined test data areas having the detected test data element.

* * * * *